(12) United States Patent
Chu et al.

(10) Patent No.: US 11,928,269 B2
(45) Date of Patent: Mar. 12, 2024

(54) FULL-AREA TOUCH DEVICE HAVING SUPPORT SHEET WITH INCLINED CONNECTING ARM

(71) Applicant: SUNREX TECHNOLOGY CORP., Taichung (TW)

(72) Inventors: Yin Chu, Taichung (TW); Chih-Po Ku, Taichung (TW); Xiao-Bing Zhang, Sichuan Province (CN)

(73) Assignee: Sunrex Technology Corp., Taichung (TW)

( * ) Notice: Subject to any disclaimer, the term of this patent is extended or adjusted under 35 U.S.C. 154(b) by 0 days.

(21) Appl. No.: 17/976,265

(22) Filed: Oct. 28, 2022

(65) Prior Publication Data

US 2023/0236679 A1 Jul. 27, 2023

(30) Foreign Application Priority Data

Jan. 27, 2022 (CN) .......................... 202210102762.7
Mar. 22, 2022 (TW) ................................... 111110625

(51) Int. Cl.
G06F 3/0354 (2013.01)
B32B 3/26 (2006.01)
B32B 7/12 (2006.01)

(52) U.S. Cl.
CPC .......... *G06F 3/03547* (2013.01); *B32B 3/266* (2013.01); *B32B 7/12* (2013.01); *B32B 2307/51* (2013.01); *B32B 2457/208* (2013.01)

(58) Field of Classification Search
CPC .......... B32B 2307/51; B32B 2457/208; B32B 3/266; B32B 7/12; G06F 3/03547; G06F 3/016; G06F 1/1643; G06F 3/042; G06F 1/169; G06F 3/0446; H03K 17/9618; H05K 5/0213
See application file for complete search history.

(56) References Cited

U.S. PATENT DOCUMENTS

| | | | |
|---|---|---|---|
| 2011/0018816 A1* | 1/2011 | Liu .................. | G06F 1/169 345/173 |
| 2014/0339062 A1* | 11/2014 | Glad .................. | G06F 1/1643 29/622 |
| 2017/0249013 A1* | 8/2017 | Glad .................. | G06F 3/016 |
| 2019/0212861 A1* | 7/2019 | Monson ............... | G06F 3/0446 |
| 2020/0019259 A1* | 1/2020 | Wang .................. | G06F 3/042 |
| 2020/0089278 A1* | 3/2020 | Wang .................. | H05K 5/0213 |
| 2022/0308725 A1* | 9/2022 | Ren .................. | H03K 17/9618 |

FOREIGN PATENT DOCUMENTS

CN 203689477 U * 7/2014

* cited by examiner

*Primary Examiner* — Richard J Hong
(74) *Attorney, Agent, or Firm* — Burris Law, PLLC

(57) ABSTRACT

A full-area touch device includes a touch control assembly, a plurality of support elastic sheet assemblies, a support frame and a limiting unit structure. The touch control assembly is movably disposed on the support frame. The support elastic sheet assemblies is disposed between the touch control assembly and the support frame to enable the touch control assembly to move relative to the support frame between an unpressed position and a pressed position. The limiting unit structures is disposed between the touch control assembly and the support frame for limiting height position and travel distance of the touch control assembly.

9 Claims, 11 Drawing Sheets

US 11,928,269 B2

FULL-AREA TOUCH DEVICE HAVING SUPPORT SHEET WITH INCLINED CONNECTING ARM

CROSS-REFERENCE TO RELATED APPLICATION

This application claims priority of Taiwanese Patent Application No. 111110625, filed on Mar. 22, 2022, and priority of Chinese Patent Application No. 202210102762.7, filed on Jan. 27, 2022.

FIELD

This disclosure relates to a field of computer technology, and more particularly to a full-area touch device applied to a notebook computer.

BACKGROUND

A touch pad is a plate placed in front of a notebook computer keyboard, allowing the user to move the cursor moving with the fingers on the plate. Typically, computer touch pads are presented in a half-area touch manner, in which there are defects as follows:

(1) The upper half region of the touch pad is a fixed structure that cannot be pressed, and a user can only press the lower half region of the touch pad, and the consumer will be inconvenienced and have a bad experience during use.

(2) The touch pad implementing the half-area touch manner has a complicated structure with numerous components, so that the touch pad is relatively thicker, and does not meet the requirements of the current light and thin notebook computer;

(3) The assembly process of the touch pad implementing the half-area touch manner is complicated, and has high defective rate and high production cost, so the touch pad has no competitive advantage on the market.

SUMMARY

The object of the disclosure is to provide a full-area touch device that can alleviate at least one of the drawbacks of the prior art.

According to the disclosure, the full-area touch device includes a touch control assembly, a plurality of support elastic sheet assemblies, a support frame and a limiting unit structure. The touch control assembly is movably disposed on the support frame. The support elastic sheet assemblies is disposed between the touch control assembly and the support frame to enable the touch control assembly to move relative to the support frame between an unpressed position and a pressed position. The limiting unit structures is disposed between the touch control assembly and the support frame for limiting height position and travel distance of the touch control assembly.

BRIEF DESCRIPTION OF THE DRAWINGS

Other features and effects related to the present disclosure will be clearly presented in the embodying manner with reference to the drawings, in which.

DETAILED DESCRIPTION

Figure 1:
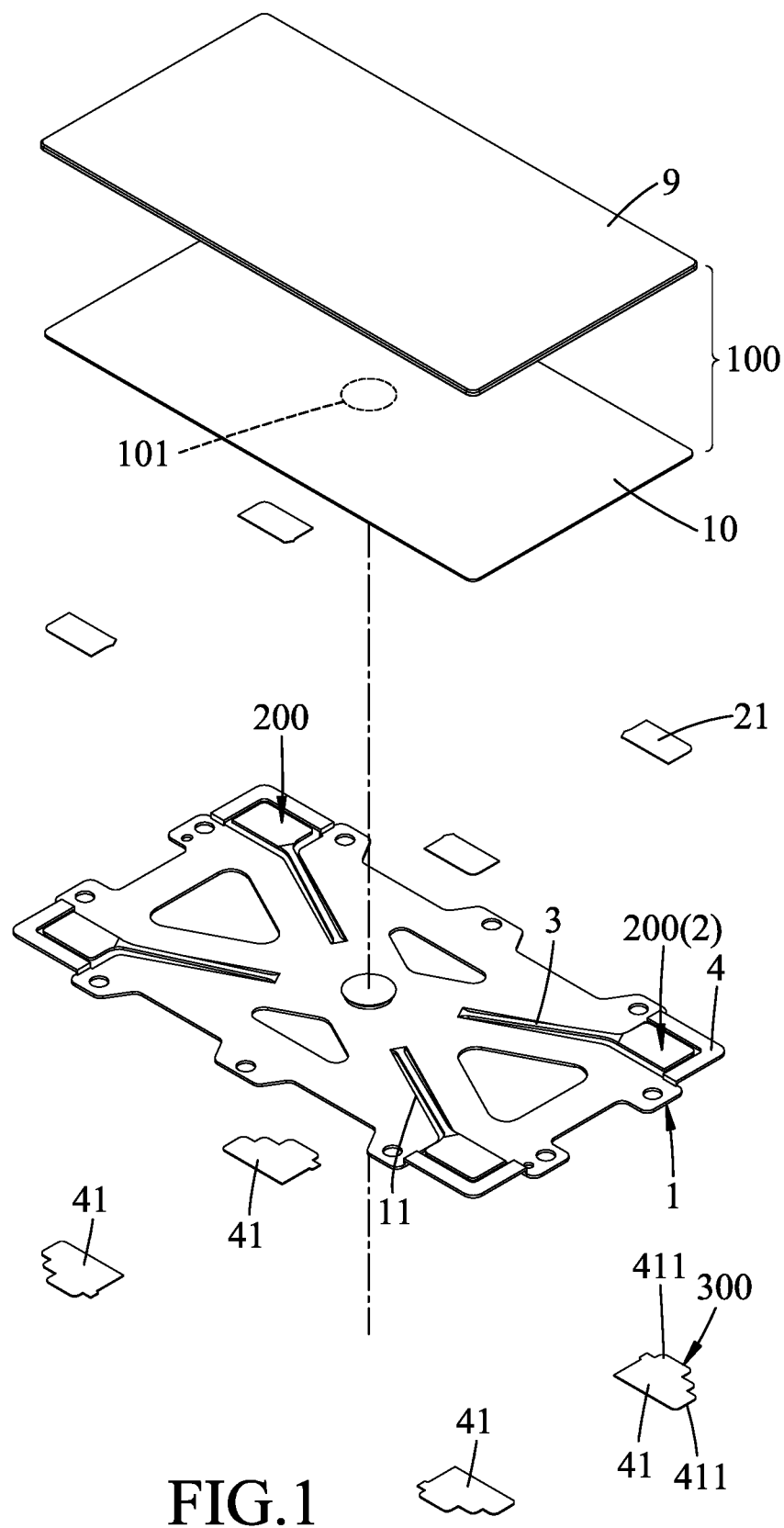
FIG. 1 is an exploded perspective view of a full-area touch device according to a first embodiment of the present disclosure.
Figure 2:
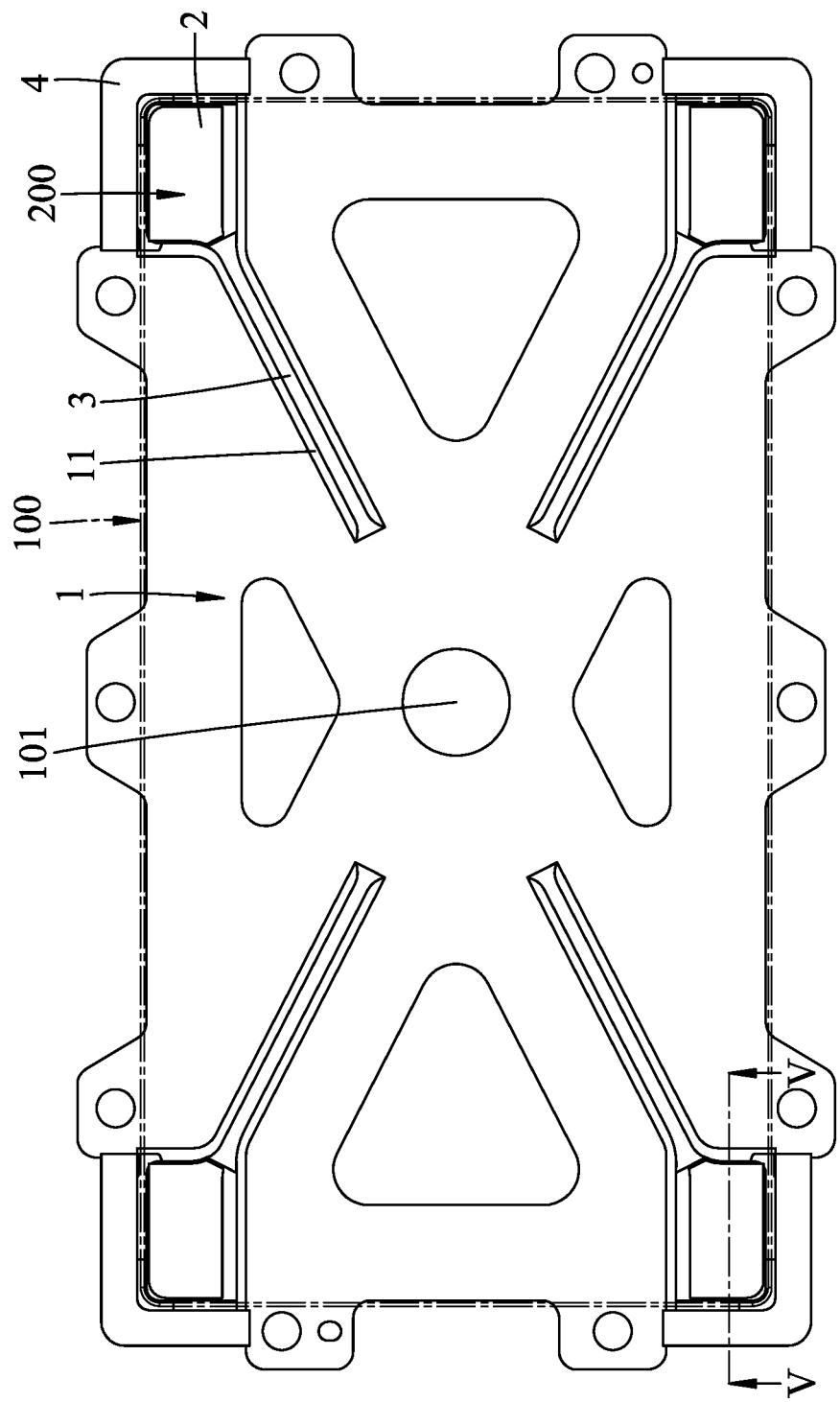
FIG. 2 is a schematic top view of the first embodiment.

Before the present disclosure is described in detail, it should be noted that in the following description below, similar elements are labeled with the same reference numbers.

Referring to FIGS. 1 to 4, a first embodiment of a full-area touch device of the present disclosure includes a touch control assembly 100, a plurality of support elastic sheet assemblies 200, and a support frame 1. The touch control assembly 100 includes a touch pad 9, and a PCB plate 10 connected to the touch pad 9. The touch pad 9 and the PCB plate 10 are attached to each other in order to be able to receive press feedback quickly.

The touch control assembly 100 is movably disposed above the support frame 1, and the support elastic sheet assemblies 200 are disposed between the touch control assembly 100 and the support frame 1, so that the touch control assembly 100 is movable relative to the support frame 1 between an unpressed position and a pressed position. Any area of the touch control assembly 100 (that is, any location of a top surface of the touch pad 9) can be pressed. When the touch control assembly 100 is subjected to a pressing force, the support elastic sheet assemblies 200 are deformed by the pressing force, and the touch control assembly 100 is moved to the pressed position. When the pressing force on the touch control assembly 100 is eliminated, the support elastic sheet assemblies 200 recover from deformation, and the touch control assembly 100 moves to the unpressed position. The full-area touch device further includes a plurality of limiting unit structures 300 disposed between the touch control assembly 100 and the support frame 1. The limiting unit structures 300 are used for limiting the height position and travel distance of the touch control assembly 100, so that the full-area touch device can be designed to be light and thin, thus meeting consumers' needs for light and thin notebooks.

As shown in FIG. 1, in this embodiment, there are four support elastic sheet assemblies 200 disposed between the touch control assembly 100 and the support frame 1. The support elastic sheet assemblies 200 are respectively disposed at four corners of the touch control assembly 100. The support elastic sheet assemblies 200 support the touch control assembly 100. When any area of the touch control assembly 100 is pressed, the entire touch control assembly 100 can move down to trigger a contact 101 of the touch control assembly 100.

Specifically, each support elastic sheet assembly 200 includes a first support sheet 2 and a first connecting arm 3. The first support sheets 2 are used for supporting the touch control assembly 100. An end of each first connecting arm 3 is connected to the support frame 1, and the other end of each first connecting arm 3 is connected to a respective one of the first support sheets 2. Bottom ends of the first connecting arms 3 are connected to the support frame 1, and top ends of the first connecting arms 3 are respectively connected to the first support sheets 2, so that the first support sheets 2 are suspended and supporting the touch control assembly 100. With the four first support sheets 2 acting on the four corners of the touch control assembly 100, the touch control assembly 100 can remain balanced.

In one embodiment, the full-area touch device further includes four first adhesive layers 21. Each first adhesive layer 21 is disposed between a respective one of the first support sheets 2 and the touch control assembly 100, so the first adhesive layers 21 fix the first support sheets 2 and the touch control assembly 100 together. When any area of the touch control assembly 100 is pressed, the entire touch control assembly 100 is capable of moving downwardly.

Figure 3:
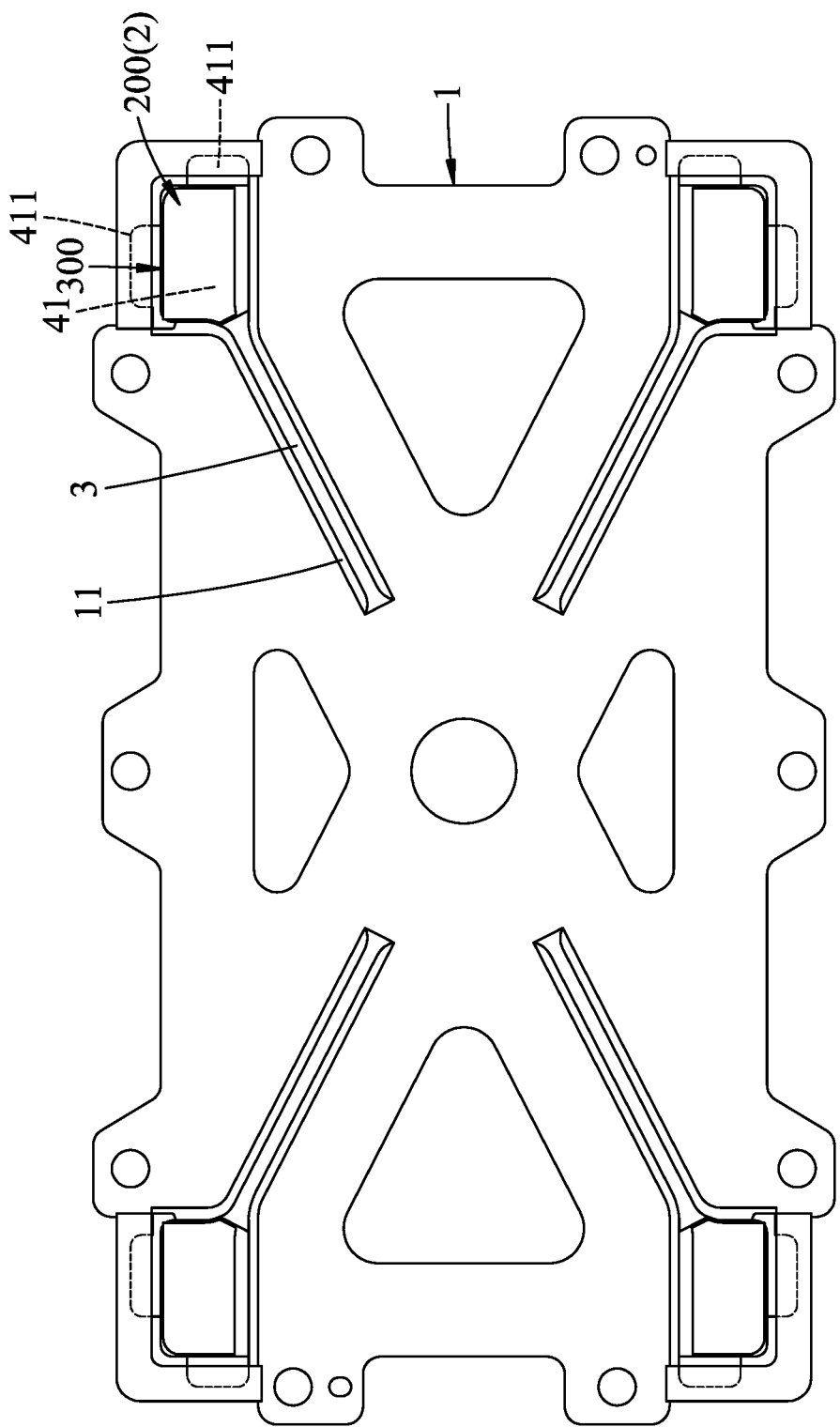
FIG. 3 is a top view of a support frame of the first embodiment.

As shown in FIG. 3, the first connecting arms 3 are straight-plate shaped, and the first connecting arms 3 are inclinedly disposed, so that the first support sheets 2 are higher than the support frame 1. The support frame 1 has a plurality of first dodge holes 11 shaped to correspond to the first support sheets 2 and the first connecting arms 3. When the touch control assembly 100 is pressed, the first support sheets 2 and the first connecting arms 3 can be moved into the first dodge holes 11, so that the thickness of the full-area touch device can be reduced.

A full-area pressing solution provided by the disclosure is an important factor to realize thin and light notebook computers, and the present disclosure provides an integrated pressing advantage and superior common material characteristics, so as to improve the yield rate of the entire machine full-area touch device.

Figure 4:
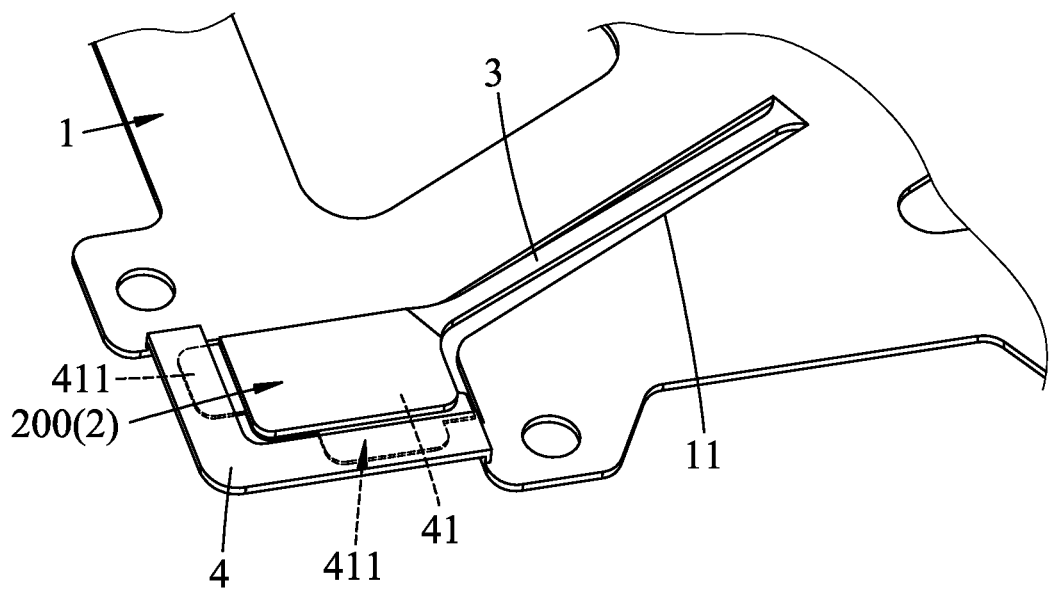
FIG. 4 is an enlarged fragmentary perspective view of the support frame of the first embodiment.
Figure 5:
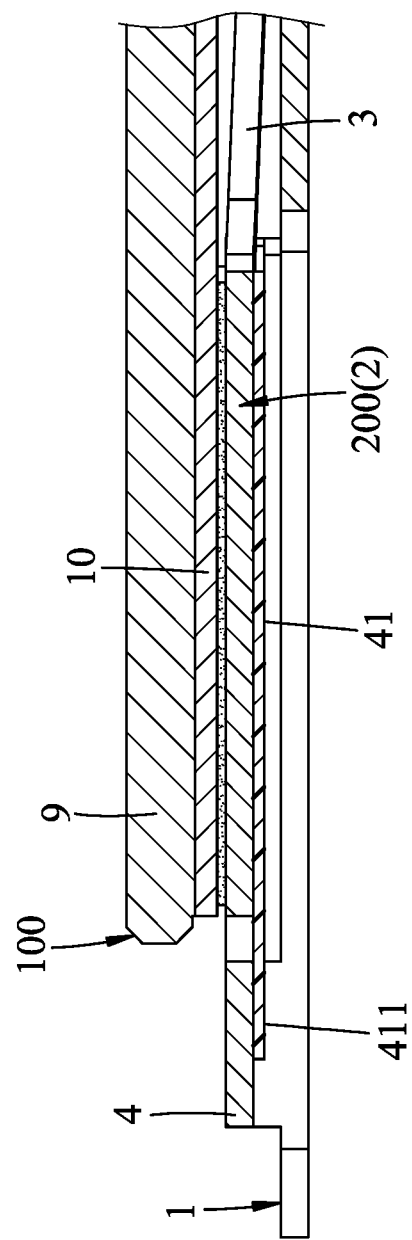
FIG. 5 is a fragmentary sectional view taken along line V-V in FIG. 2.

As shown in FIG. 4, in this embodiment, the limiting unit structures 300 include a plurality of L shaped first limiting frames 4 respectively connected to four corners of the support frame 1, and a plurality of plate-shaped limiting plates 41 adhesively fixed to the four corners of the PCB plate 10. Each of the limiting plates 41 has two protruding sheets 411. The first limiting frames 4 cooperating with the limiting plates 41 to limit the height position and the travel distance of the touch control assembly 100. The number of the first limiting frames 4 may be adjusted according to actual requirements. When the touch control assembly 100 is moved to the unpressed position, the first support sheets 2 pass through the first dodge holes 11 and move upwardly to a certain position, the first limiting frames 4 limit the limiting plates 41 from passing through the first dodge holes 11, so further upward movement of the touch control assembly 100 is blocked by the first limiting frames 4, thereby effectively limiting the height position and the travel distance of the touch control assembly 100. The present disclosure adopts the structural design of the first limiting frames 4, which can greatly reduce the thickness of the full-area touch device, so the full-area touch device can achieve a thickness of 3.0 to 3.3 millimeters. Compared to the touch pad in a conventional notebook computer with a thickness of 3.7 to 4.0 millimeter, the thickness of the full-area touch device is reduced.

As shown in FIG. 6 to FIG. 11, a second embodiment of the full-area touch device of the present disclosure includes a touch control assembly 100, two support elastic sheet assemblies 200' and a support frame 1'. The touch control assembly 100 includes a touch pad 9, and a PCB plate 10 connected to the touch pad 9. The touch pad 9 and the PCB plate 10 are attached to each other in order to be able to receive press feedback quickly. The touch control assembly 100 is movably disposed on the support frame 1', and the support elastic sheet assemblies 200' are disposed between the touch control assembly 100 and the support frame 1', so that the touch control assembly 100 can move relative to the support frame 1' between an unpressed position and a pressed position. Any area of the touch control assembly 100 can be pressed. When the touch control assembly 100 is subjected to a pressing force, the support elastic sheet assemblies 200' are deformed by the pressing force, the touch control assembly 100 is moved to the pressed position. When the pressing force on the touch control assembly 100 is eliminated, the support elastic sheet assemblies 200' recover from deformation, and the touch control assembly 100 is moved to the unpressed position. In one embodiment, the full-area touch device further includes a limiting unit structure 300' disposed between the touch control assembly 100 and the support frame 1'. The limiting unit structure 300' is used for limiting the height position and travel distance of the touch control assembly 100, so that the full-area touch device can be designed to be light and thin, thus meeting consumers' needs for light and thin notebooks.

Figure 6:
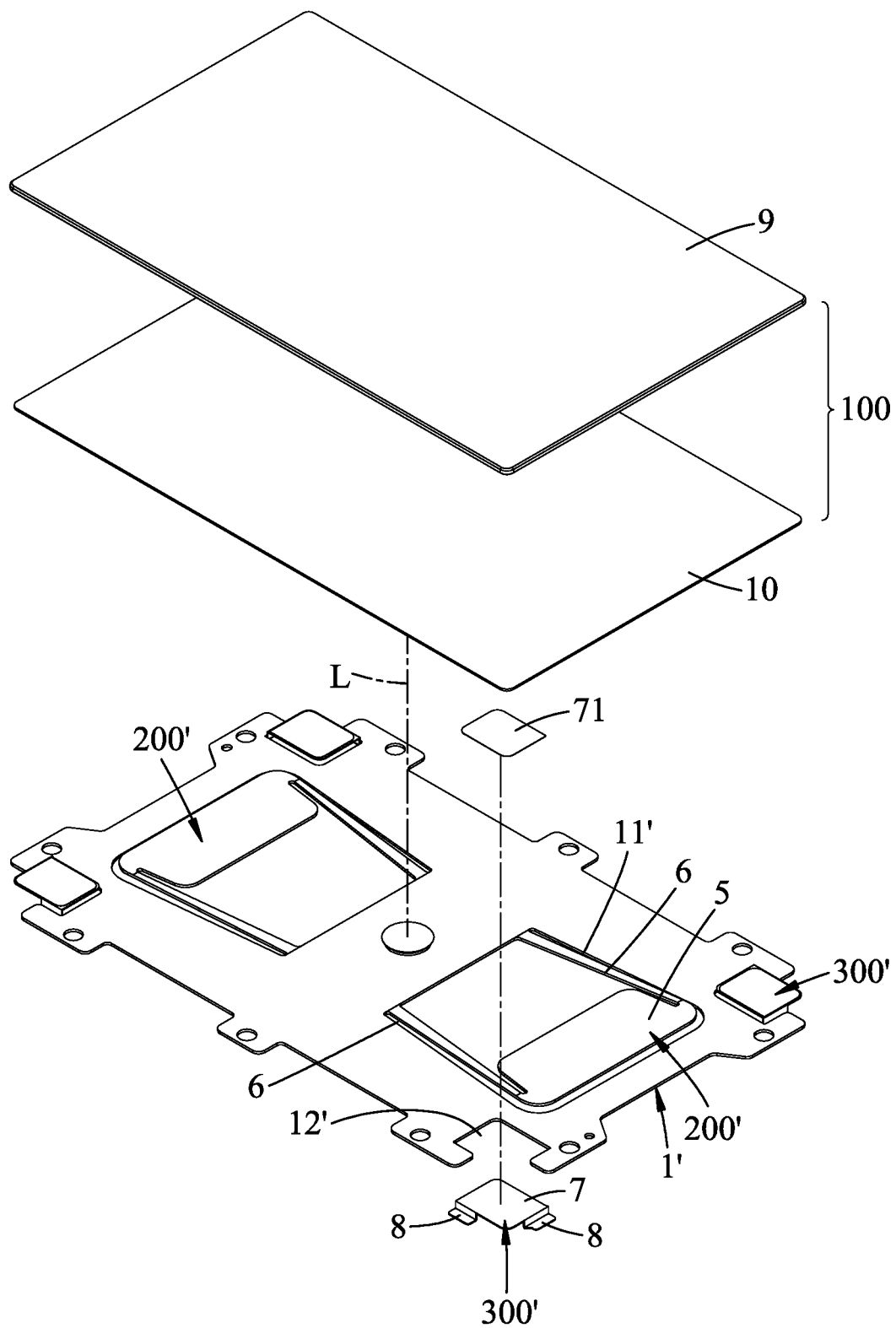
FIG. 6 is an exploded perspective view of a full-area touch device according to a second embodiment of the present disclosure.
Figure 7:
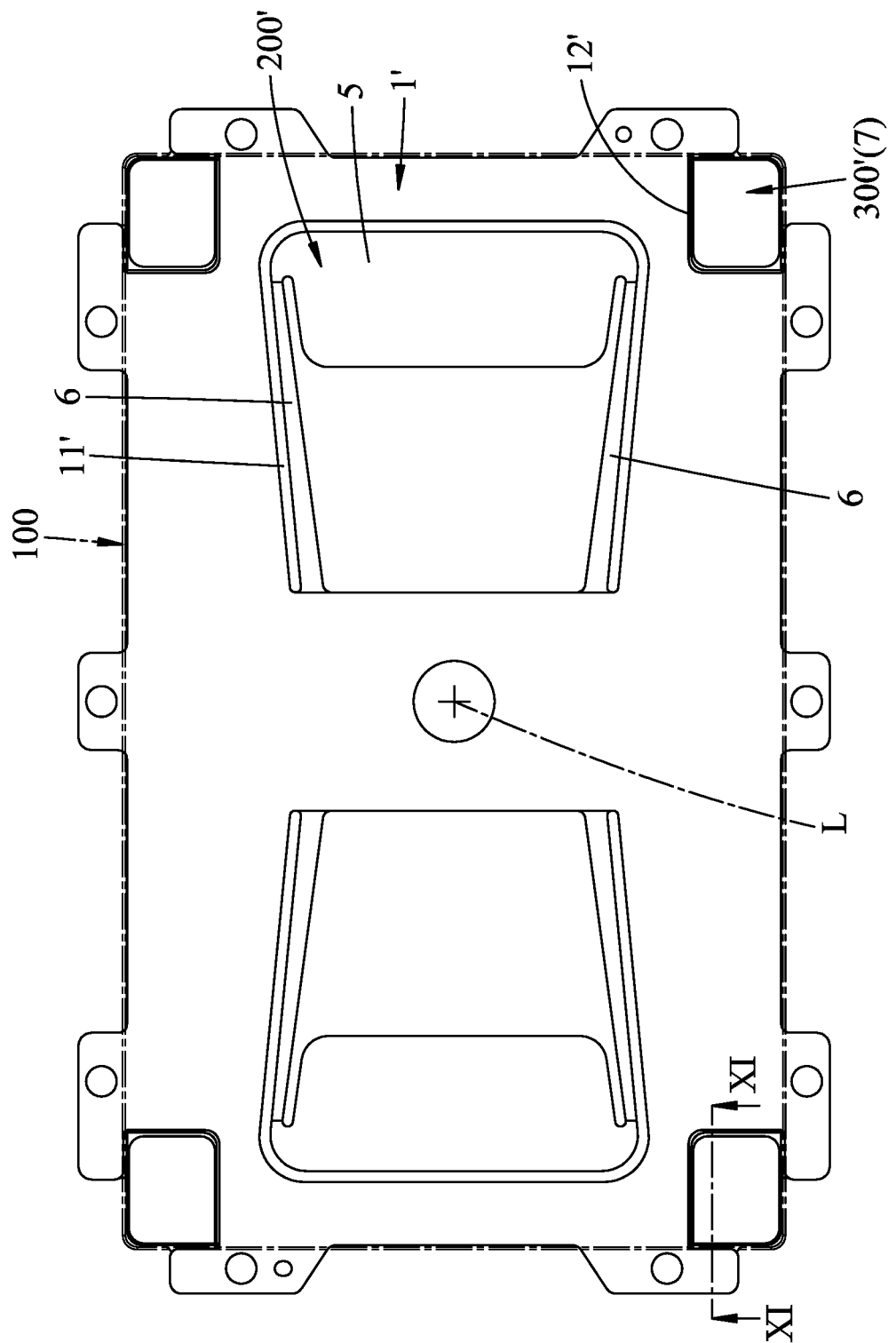
FIG. 7 is a schematic top view of the second embodiment.

As shown in FIG. 6, in this embodiment, the support elastic sheet assemblies 200' are disposed between the touch control assembly 100 and the support frame 1', and are symmetrically distributed about a central axis L of the touch control assembly 100. The support elastic sheet assemblies 200' are relatively large and can support the touch control assembly 100.

Figure 8:
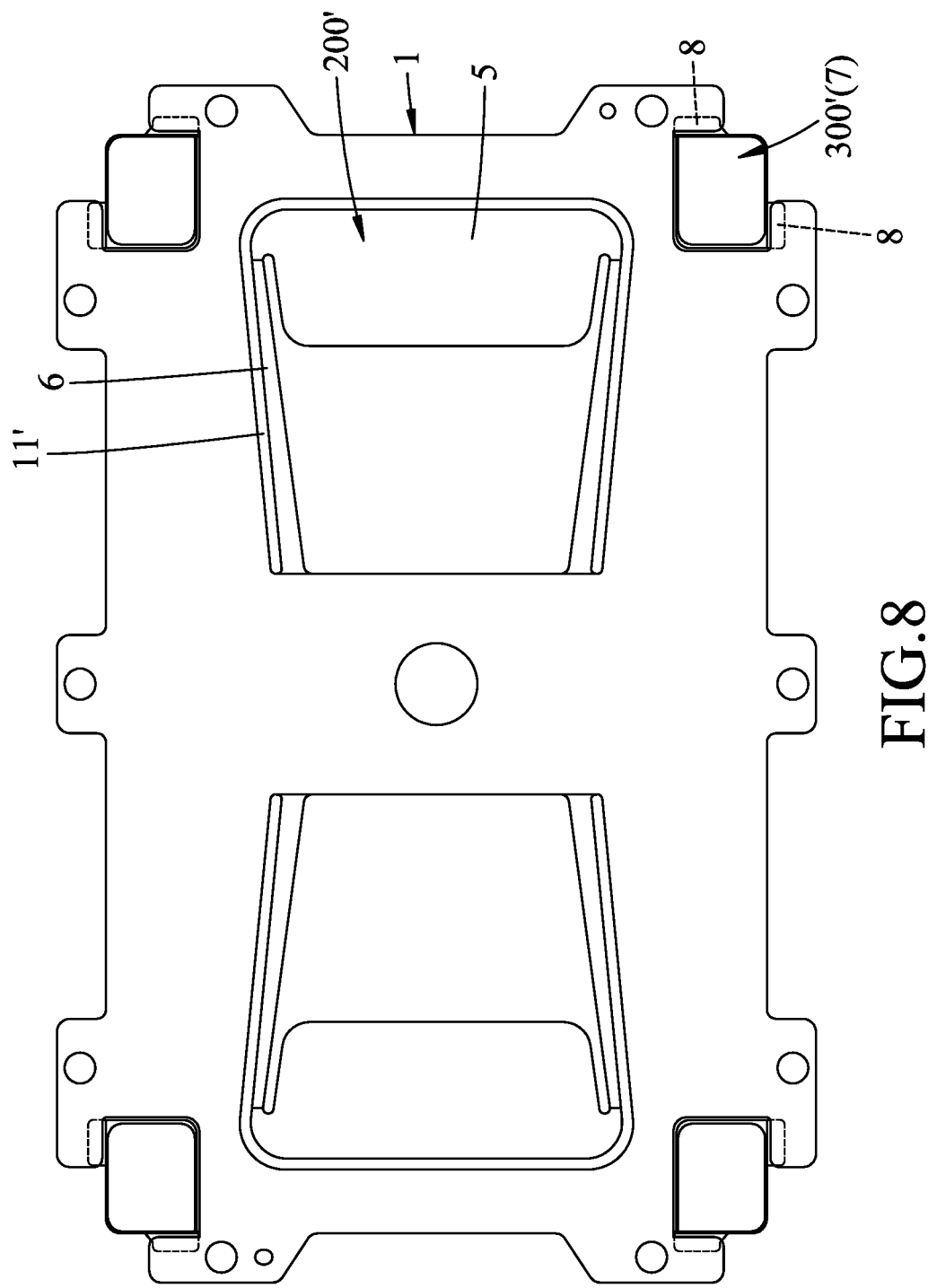
FIG. 8 is a top view of a support frame of the second embodiment.
Figure 9:
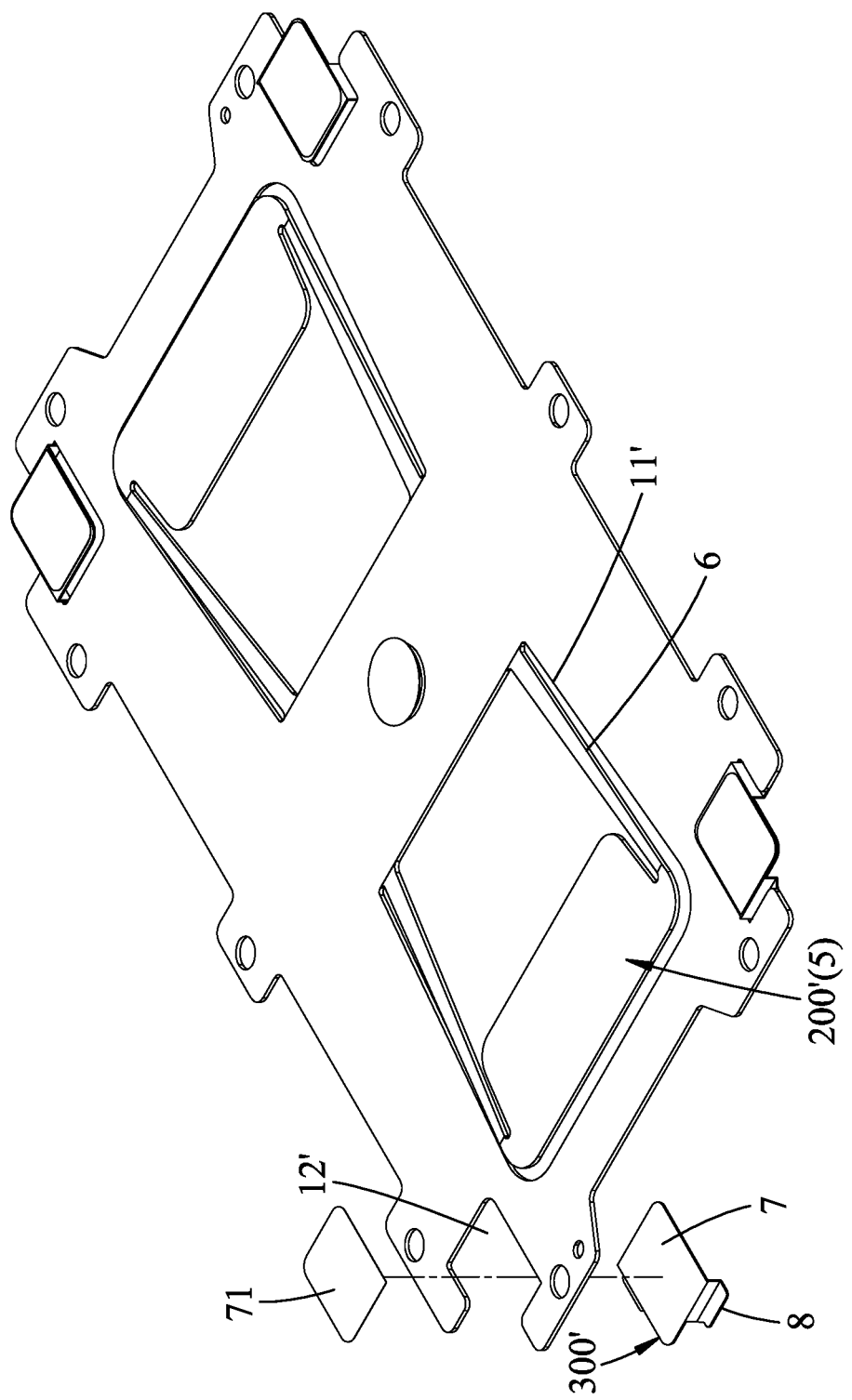
FIG. 9 is a partly exploded perspective view of the support frame of the second embodiment.
Figure 10:
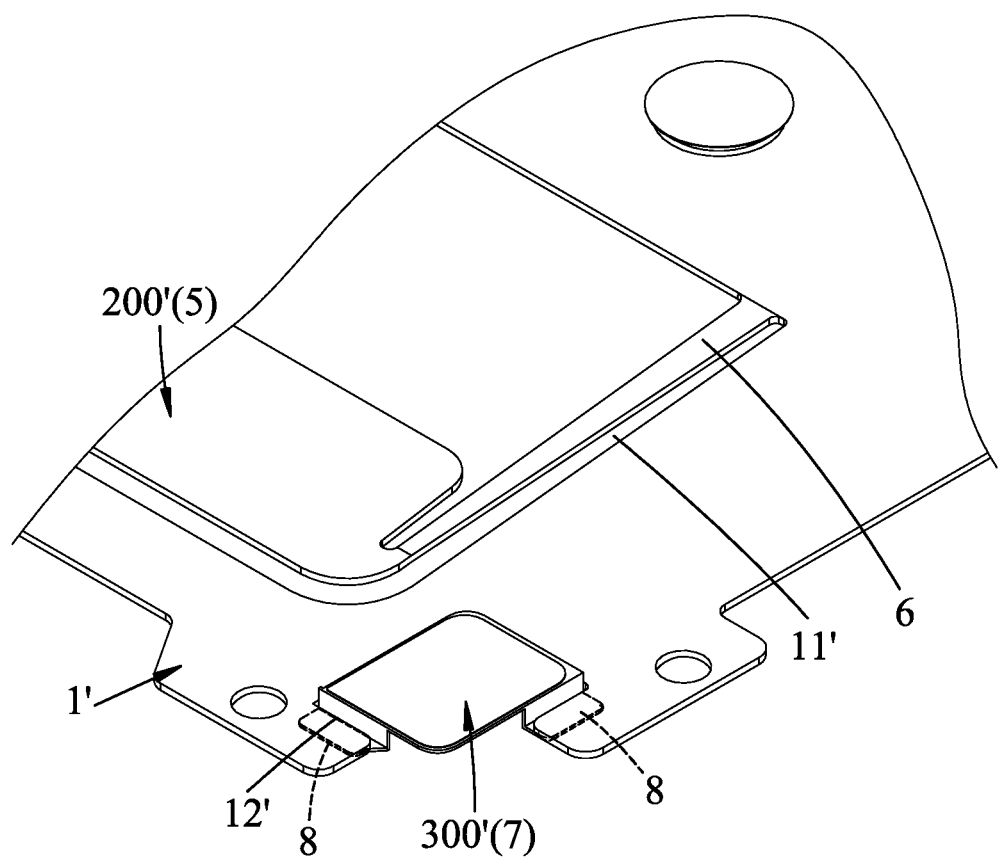
FIG. 10 is an enlarged fragmentary perspective view of the support frame of the second embodiment.
Figure 11:
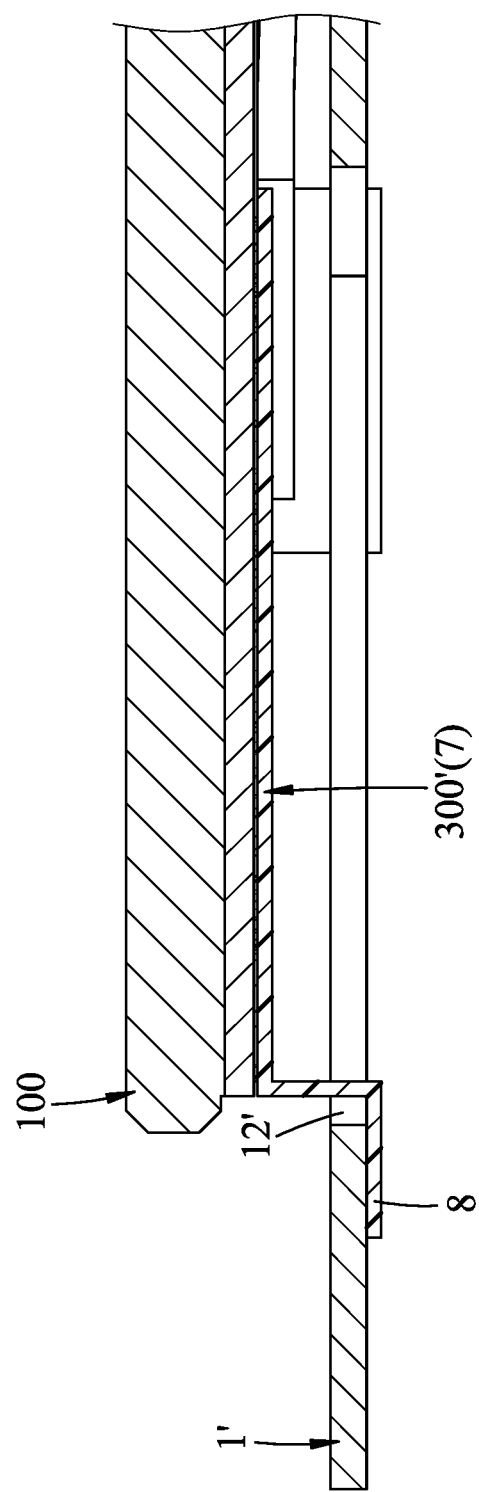
FIG. 11 is a fragmentary sectional view taken along line XI-XI of FIG. 7.

As shown in FIGS. 8 and 10, specifically, each support elastic sheet assembly 200' includes a second support sheet 5 and a pair of second connecting arms 6. The second support sheets 5 are used to support the touch control assembly 100, two sides of the second support sheet 5 of each of the support elastic sheet assemblies 200' are respectively connected to the second connecting arms 6 of the support elastic sheet assembly 200'. An end of each second connecting arm 6 is connected to the support frame 1'. The second connecting arms 6 are bent, and are inclinedly disposed. Two second dodge hole 11' matching the second support sheets 5 and the second connecting arms 6 are defined by the support frame 1'. The second connecting arms 6 of each of the support elastic sheet assemblies 200' are distributed on two sides of the corresponding second support sheet 5, and are disposed along the edge of the second support sheet 5 to ensure that the touch control assembly 100 has a certain travel distance, and has better press operation experience.

The limiting unit structures 300' includes a plurality of limiting sheets 7, a plurality of second adhesive layers 71 each disposed between a respective one of the limiting sheets 7 and the touch control assembly 100. The edge of each of the limiting sheets 7 is formed with two L-shaped second limiting hooks 8, and the second limiting hooks 8 cooperate with the support frame 1' to limit the height position and the travel distance of the touch control assembly 100. The support frame 1' is formed with a plurality of third dodge hole 12' that match the limiting sheets 7. Each of four corners of the touch control assembly 100 is disposed with one limiting sheet 7. The second support sheets 5 and the second connecting arms 6 can achieve a pressing rebound function of the touch control assembly 100, and the four limiting sheets 7 and the support frame 1' are blocked by each other, thereby limiting the movement of the touch control assembly 100.

Compared to the half-area touch device of conventional notebook computers, the full-area touch device of the present disclosure has the following advantages:

1. By virtue of the new full-area structure, the consumer can press any area of the touch control assembly 100, significantly enhancing ease of use, tactile feeling, and user experience.

2. In the full-area structure of the present disclosure, the designs of the support elastic sheet assemblies 200, 200' and the limiting unit structures 300, 300' can fulfill the light and thin design of the full-area touch device and meet the consumers' needs for light and thin systems.

3. The full-area structure of the present disclosure can be realized in an all-in-one modular manner. That is, without the use of a notebook computer's top and bottom lids and a touch device locking structure, an all-in-one module can be provided, thereby preventing abnormalities in the fitment between the touch device and the top and bottom lids of the notebook computer due to mismatching of mold point numbers on the top and bottom lids, differences in the design of different models' top and bottom lids and the assembly structure of the touch device, and differences in materials of top and bottom lids of the notebook computer, which cause poor sharing capabilities of the touch device, and affect the notebook computer production quality due to touch device matching problems.

4. The full-area touch device of the present disclosure is structurally simple, and has relatively few components. Compared to conventional half-area touch devices, the cost of assembly and cost of materials of the full-area touch device of the present disclosure are significantly advantageous.

In the present description, the terms "attached", "connected", "fixed", etc. should be understood in a broad sense, and may be fixed connection, detachable connection, or be integral; may be mechanical connections or electrical connections; may be directly connected, or may also be indirectly connected through a middle medium, may be the internal connection between two elements or interaction relationship of the two elements. A person skilled in the art may appreciate the specific meaning of the foregoing terms in this disclosure. Furthermore, the specific features, structures, etc. described in the embodiments are included in at least one embodiment, such as those skilled in the art may combine features of different implementations without conflicting with each other. The scope of protection of the present disclosure is not limited to the above-described specific example approaches, following the basic technical idea according to the present disclosure, those ordinarily skilled in the art need not engage in creative labor and can reason out an implementation, all the aforementioned belong to the scope of protection of the present disclosure.

However, the above is merely an embodiment of the present disclosure, and certainly the scope of practicing the present disclosure is not limited thereto. Any equivalent variation and modification made according to the claims of the present disclosure and the specification of the present disclosure should still be within the scope covered by the present disclosure.

What is claimed is:

1. A full-area touch device comprising:
    a touch control assembly;
    a plurality of support elastic sheet assemblies;
    a support frame; and
    a limiting unit structure, the touch control assembly being movably disposed on the support frame, the support elastic sheet assemblies being disposed between the touch control assembly and the support frame to enable the touch control assembly to move relative to the support frame between an unpressed position and a pressed position, the limiting unit structures being disposed between the touch control assembly and the support frame for limiting height position and travel distance of the touch control assembly;
    wherein each support elastic sheet assembly includes a support sheet and a connecting arm, each support sheet being used for supporting the touch control assembly, an end of the first connecting arm of each of the support elastic sheet assemblies being connected to the support frame, the other end of the first connecting arm of each of the support elastic sheet assemblies being connected to the first support sheet of the support elastic sheet assembly; and
    wherein the first connecting arm of each of the support elastic sheet assemblies is straight plate shaped, and is inclinedly disposed, the support frame having a plurality of dodge holes shaped to correspond to the first support sheets and the first connecting arms of the support elastic sheet assemblies.

2. The full-area touch device as claimed in claim 1, wherein the number of the support elastic sheet assemblies is four, the support elastic sheet assemblies being disposed respectively at four corners of the touch control assembly.

3. The full-area touch device as claimed in claim 1, further comprising four adhesive layers, each of the adhesive layers being disposed between the touch control assembly and a respective one of the first support sheets of the support elastic sheet assemblies.

4. The full-area touch device as claimed in claim 1, wherein the limiting unit structures includes a plurality of L-shaped limiting frames connected to four corners of the support frame, and a plurality of limiting plates in plate shape and adhered to the four corners of the touch control assembly, each of the limiting plates having two protruding sheets, the first limiting frames cooperating with the limiting plate to limit the height position and the travel distance of the touch control assembly.

5. The full-area touch device as claimed in claim 1, wherein the number of the support elastic sheet assemblies is two, the support elastic sheet assemblies being symmetrically distributed about a central axis of the touch control assembly.

6. A full-area touch device comprising:
    a touch control assembly;
    a plurality of support elastic sheet assemblies;
    a support frame; and
    a limiting unit structure, the touch control assembly being movably disposed on the support frame, the support elastic sheet assemblies being disposed between the touch control assembly and the support frame to enable the touch control assembly to move relative to the support frame between an unpressed position and a pressed position, the limiting unit structures being disposed between the touch control assembly and the support frame for limiting height position and travel distance of the touch control assembly;
    wherein each of the support elastic sheet assemblies includes a support sheet and a pair of connecting arms, the support sheets being for supporting the touch control assembly, two sides of the support sheets of each of the support elastic sheet assemblies being respectively connected to the second connecting arms of the support elastic sheet assembly, an end of each second connecting arm being connected to the support frame.

7. The full-area touch device as claimed in claim 6, wherein the second connecting arms of the support elastic sheet assemblies are bent, and are inclinedly disposed, the support frame defining two second dodge hole that match the second support sheets and the second connecting arms.

8. The full-area touch device as claimed in claim 7, wherein the limiting unit structures includes a plurality of limiting sheets, a plurality of second adhesive layers each disposed between a respective one of the limiting sheets and the touch control assembly, an edge of each of the limiting sheets being formed with two L-shaped limiting hooks, the limiting hooks cooperating with the support frame to limit the height position and the travel distance of the touch control assembly.

9. The full-area touch device as claimed in claim 6, wherein the number of the support elastic sheet assemblies is two, the support elastic sheet assemblies being symmetrically distributed about a central axis of the touch control assembly.

\* \* \* \* \*